(12) United States Patent
Chen et al.

(10) Patent No.: US 6,473,313 B1
(45) Date of Patent: Oct. 29, 2002

(54) FASTENING DEVICE FOR A SECURING DATA STORAGE DEVICE

(75) Inventors: Jung Chi Chen, Taipei (TW); Kuo Chih Lin, Taipei (TW); Alvin Liu, Taipei (TW)

(73) Assignee: Hon Hai Precision Ind. Co., Ltd., Taipei Hsien (TW)

( * ) Notice: Subject to any disclaimer, the term of this patent is extended or adjusted under 35 U.S.C. 154(b) by 0 days.

(21) Appl. No.: 10/037,879

(22) Filed: Jan. 7, 2002

(51) Int. Cl.[7] .............................. H05K 5/00; H05K 7/00; G06F 1/16
(52) U.S. Cl. ...................... 361/801; 361/685; 361/740; 361/747
(58) Field of Search ................................. 361/685, 802, 361/801, 684, 686, 726, 727, 732, 740, 741, 747, 756, 759; 312/223.1, 223.2; 439/304, 928, 928.1

(56) References Cited

U.S. PATENT DOCUMENTS

| | | | | |
|---|---|---|---|---|
| 5,262,923 A | * | 11/1993 | Batta et al. | 361/685 |
| 5,510,955 A | * | 4/1996 | Taesang | 361/685 |
| 5,595,501 A | * | 1/1997 | Ho | 361/685 |
| 5,599,080 A | * | 2/1997 | Ho | 361/685 |
| 5,801,920 A | * | 9/1998 | Lee | 361/685 |
| 6,172,870 B1 | * | 1/2001 | Novotny | 361/685 |
| 6,297,952 B1 | * | 10/2001 | Liu et al. | 361/685 |
| 6,297,954 B1 | * | 10/2001 | Seo | 361/685 |
| 6,377,447 B1 | * | 4/2002 | Boe | 361/685 |
| 6,377,449 B1 | * | 4/2002 | Liao et al. | 361/685 |
| 6,381,131 B1 | * | 4/2002 | Liu et al. | 361/685 |
| 6,386,656 B1 | * | 5/2002 | Chen | 312/223.2 |
| 6,386,686 B1 | * | 5/2002 | Liu et al. | 361/685 |

* cited by examiner

*Primary Examiner*—David Martin
*Assistant Examiner*—Phuong T. Vu
(74) *Attorney, Agent, or Firm*—Wei Te Chung

(57) ABSTRACT

A fastening device for securing a data storage device (50) with a screw (52) secured thereon includes a locating plate (10) and a bracket (26). The bracket receives the data storage device therein, and the locating plate secures the data storage device to the bracket. The bracket includes first and second side panels (30, 40). The first side panel defines a slot (32). The second side panel defines a groove (42) for slidingly receiving the screw of the data storage device. The locating plate includes an engaging section (12) and an elastic section (16). The engaging section forms a latch (22) stamped toward and received in the slot of the bracket, and engaged with the data storage device. The elastic section extends from the engaging section, and provides the locating plate with elastic deformation capability so that the latch can move in and out of the slot of the bracket.

15 Claims, 4 Drawing Sheets

FASTENING DEVICE FOR A SECURING DATA STORAGE DEVICE

BACKGROUND OF THE INVENTION

1. Field of the Invention

The present invention relates to fastening devices, and more particularly to a fastening devices which readily and firmly secure computer data storage devices.

2. Description of Related Art

Conventionally, a computer data storage device is directly secured to a bracket using screws. Installation and removal of screws requires a tool. This is unduly complicated and laborious, and reduces the efficiency of assembly in mass production facilities.

A common means to overcome the above shortcomings is to have a pair of slideways formed in a bottom portion of opposite side walls of the bracket. A sliding rail is then attached to each side of the data storage device. Thus, the data storage device can be readily slid into and secured to the bracket. Unfortunately, the sliding rails themselves are secured to the data storage device with screws. Thus use of the sliding rails does not significantly simplify the assembly procedure.

A common means for further simplifying assembly is to have a pair of plastic plates attached to opposite sides of the data storage device. The plates can secure the data storage device to a bracket without any tool. However, gaps are formed between the data storage device and the bracket. This results in increased risk of Electromagnetic Interference (EMI).

Examples of the abovementioned mechanisms are disclosed in Taiwan Patent Applications Nos. 81207129, 78201813, 79209891, 82207667, and 82202204; and U.S. Pat. Nos. 5,510,955 and 5,262,923.

SUMMARY OF THE INVENTION

Accordingly, an object of the present invention is to provide a fastening device which readily and firmly secures a data storage device.

A further object of the present invention is to provide a fastening device having simple structure, In order to achieve the objects set out above, a fastening device of the present invention for securing a data storage device comprises a locating plate and a bracket. The bracket receives the data storage device therein, and the locating plate secures the data storage device to the bracket. The bracket includes first and second side panels. The first side panel defines a slot. The second side panel defines a groove for slidingly receiving a screw of the data storage device. The locating plate comprises an engaging section and an elastic section. The engaging section forms a latch stamped toward and received in the slot of the bracket, and engaged with the data storage device. The elastic section extends from the engaging section, and provides the locating plate with elastic deformation capability so that the latch can move in and out of the slot of the bracket.

Other objects, advantages and novel features of the present invention will become more apparent from the following detailed description when taken in conjunction with the accompanying drawings.

DETAILED DESCRIPTION OF THE INVENTION

Figure 1:
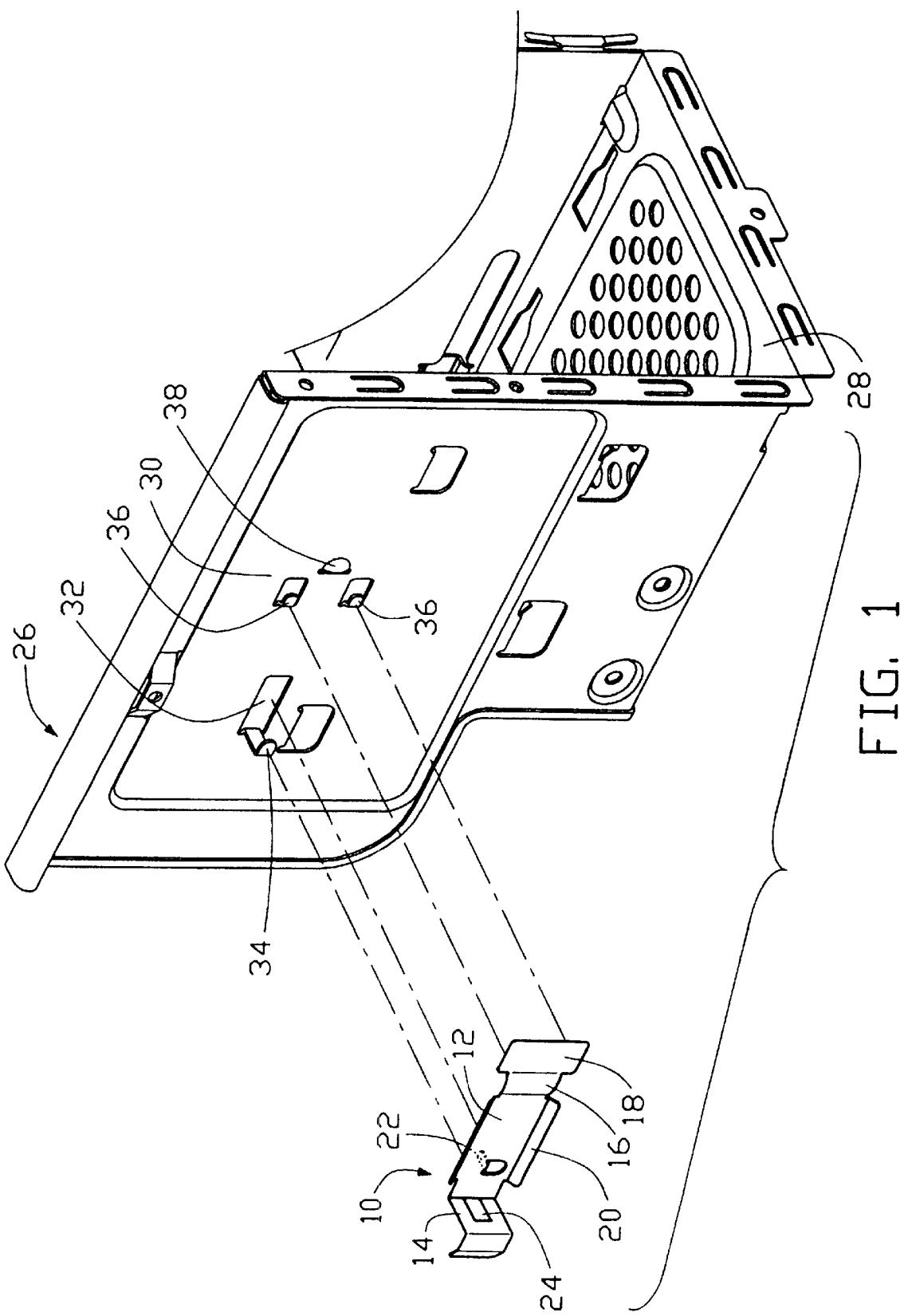
FIG. 1 is an exploded view of a fastening device in accordance with the present invention.

Reference will now be made to the drawing figures to describe the preferred embodiment of the present invention in detail.

Figure 2:
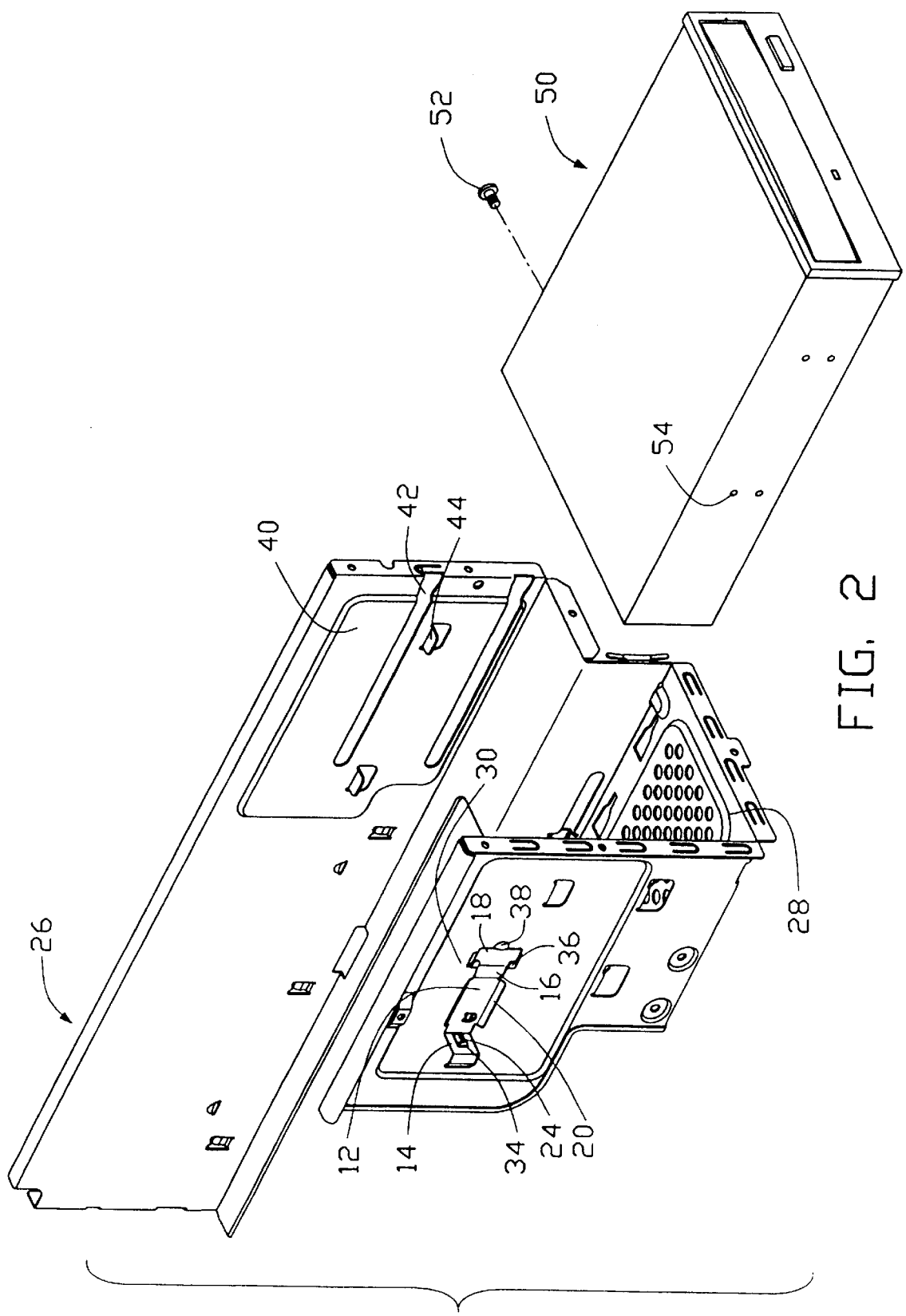
FIG. 2 is an exploded view of the fastening device of FIG. 1 fully assembled, together with a data storage device.

Referring to FIGS. 1 and 2, a fastening device in accordance with the present invention comprises a locating plate 10 and a bracket 26. The fastening device secures a data storage device 50. The data storage device 50 defines a hole 54 in a side wall thereof, and a screw hole (not visible) in an opposite side wall thereof. A screw 52 is inserted in the screw hole of the data storage device 50.

The locating plate 10 of the fastening device is stamped from a metal plate. The locating plate 10 comprises an elongated central engaging section 12, an operating section 14, an arcuate elastic section 16 and a rectangular positioning section 18. A latch 22 is perpendicularly stamped from the engaging section 12 in a first direction. The latch 22 is disposed in the vicinity of one end of the engaging section 12. The operating section 14 is perpendicularly bent from an end of the engaging section 12 that is nearest the latch 22, in a second direction which is opposite to the first direction. The operating section 14 facilitates operation of the locating plate 10. A pair of reinforcing flanges 20 is bent from opposite longitudinal edges of the engaging section 12 respectively. The flanges 20 are bent to be oriented at obtuse angles relative to an outer face of the engaging section 12, and to be generally symmetrically opposite each other. An elongated guideway 24 is defined in the operating section 14. The elastic section 16 extends generally coplanarly from an end of the engaging section 12 which is opposite to the operating section 14. The elastic section 16 is arcuate, and provides the locating plate 10 with elastic deformation capability. The positioning section 18 extends generally coplanarly from a free end of the elastic section 16. A height of the positioning section 18 is greater than a height of the elastic section 16. The locating plate 10 is secured to the bracket 26 via the positioning section 18.

The bracket 26 comprises a bottom panel 28, and a pair of opposite first and second side panels 30, 40 extending vertically from the bottom panel 28. An L-shaped stopping tab 34 is outwardly stamped from a rear portion of the first side panel 30, for being received in the guideway 24 of the locating plate 10. A slot 32 is thereby defined in the first side panel 30 at the stopping tab 34. The slot 32 provides the latch 22 of the locating plate 10 with access to the hole 54 of the data storage device 50. The latch 22 can be moved in and out of the slot 32 due to elastic deformation of the elastic section 16. A pair of L-shaped hooks 36 is outwardly stamped from a middle portion of the first side panel 30. A blocking protrusion 38 is outwardly formed on the first side panel 30, forward of and generally between the hooks 36. The hooks 36 and blocking protrusion 38 cooperatively define a space (not labeled) therebetween for pressingly receiving the positioning section 18 of the locating plate 10. A horizontal groove 42 is defined in a middle of a front portion of the second side panel 40 of the bracket 26, for slidingly receiving the screw 52 secured to the data storage device 50. A plurality of support tabs 44 is inwardly and horizontally stamped from the first and second side panels 30, 40, for supporting the data storage device 50.

Referring to FIGS. 1–2, in assembly of the fastening device, the positioning section 18 of the locating plate 10 is pressingly received in the space between the hooks 36 and blocking protrusion 38. The hooks 36 clasp edge portions of the positioning section 18 at the elastic section 16, and the blocking protrusion 38 abuts against a free end of the positioning section 18. The latch 22 of the locating plate 10 is accommodated in the slot 32 of the bracket 26.

Figure 3:
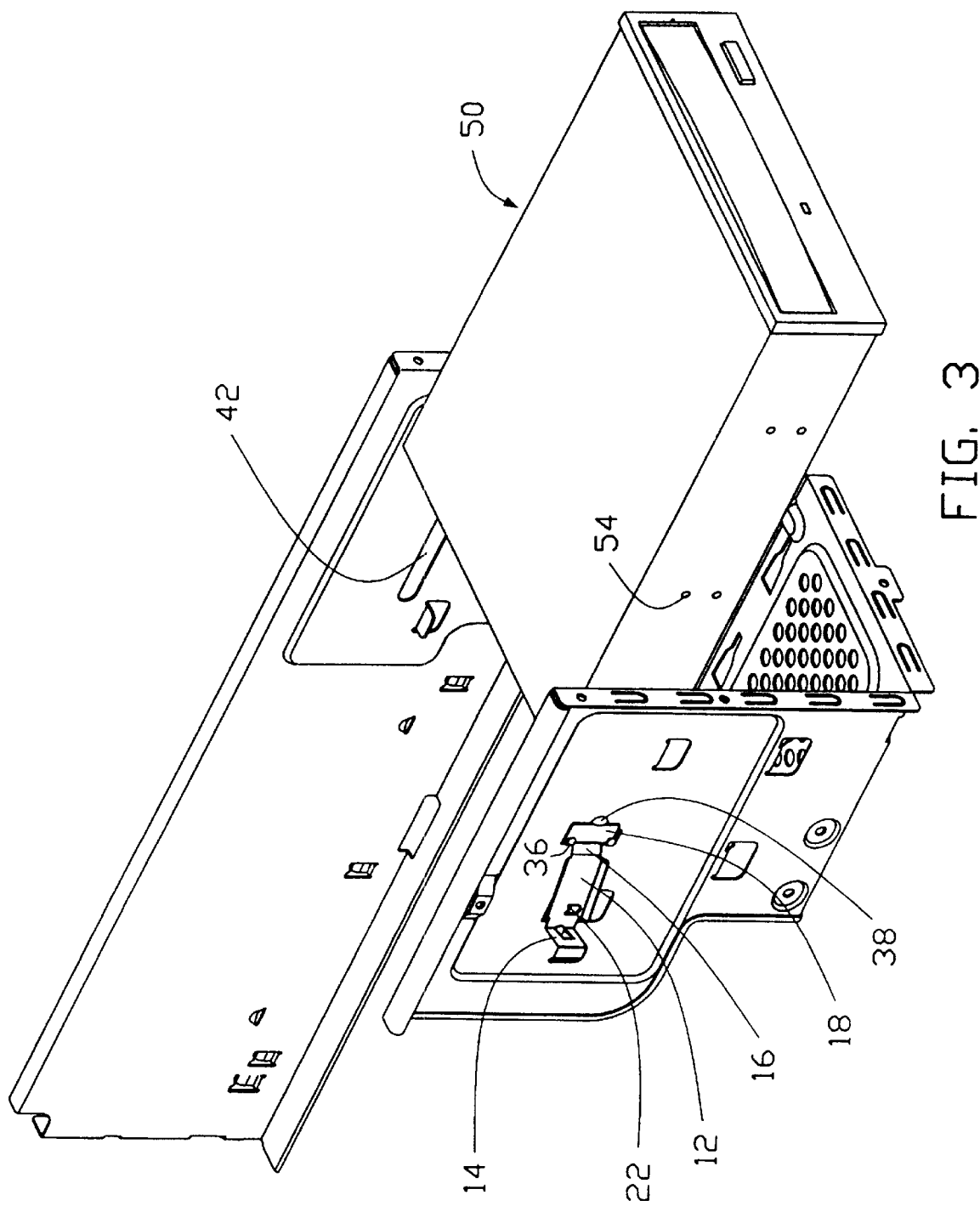
FIG. 3 is similar to FIG. 2, but showing the data storage device partly received in a bracket of the fastening device.
Figure 4:
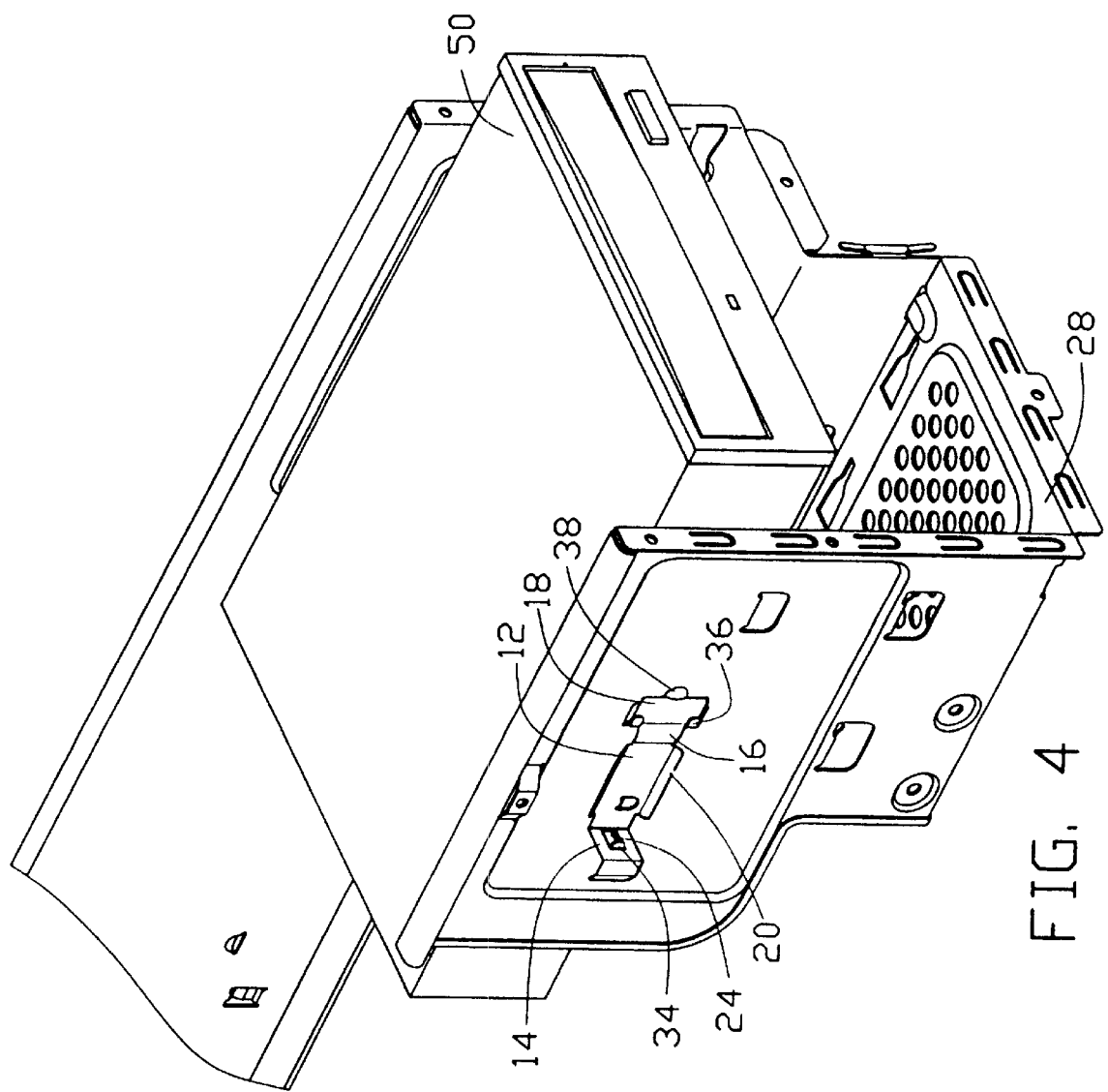
FIG. 4 is similar to FIG. 3, but showing the data storage device completely received in the bracket and secured thereto by the fastening device.

Referring to FIGS. 2–4, in use, the screw 52 is engaged in the screw hole (not visible) of the data storage device 50. The operating section 14 of the locating plate 10 is pulled outwardly, to cause the latch 22 of the locating plate 10 to exit the slot 32 of the bracket 26. With the latch 22 remaining outside the slot 32, the data storage device 50 is placed onto the support tabs 44 of the bracket 26. The data storage device 50 is then pushed into the bracket 26, with the screw 52 sliding in the groove 42. The data storage device 50 is pushed until the hole 54 thereof opposes the latch 22. The operating section 14 is then released to allow the locating plate 10 to resiliently return to its original position. In this process, the latch 22 is inserted into the hole 54 of the data storage device 50. The data storage device 50 is thereby readily and firmly secured to the bracket 26 by the locating plate 10.

During the above assembly procedure, the stopping tab 34 of the bracket 26 prevents the operating section 14 of the locating plate 10 from being pulled out too far. When the locking plate 14 is pulled out as far as is safely permissible, the stopping tab 34 engages with an end portion of the engaging section 12 remote from the elastic section 16 (see FIG. 3). Thus the elastic section 16 is protected from excessive deformation.

It is to be understood, however, that even though numerous characteristics and advantages of the present invention have been set forth in the foregoing description, together with details of the structure and function of the invention, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. A fastening device for securing a data storage device, the fastening device comprising:
    a bracket adapted for receiving the data storage device therein, the bracket having a side panel, a stopping tab stamped outwardly from the side panel, a slot being thereby defined in the side panel at the stopping tab; and
    a locating plate secured to the side panel of the bracket, the locating plate comprising an elongated engaging section, an operating section, an elastic section, and a latch, wherein the latch is perpendicularly stamped from the engaging section in a first direction, and the latch extends through the slot of the bracket for engaging with the data storage device, and wherein the operating section extends perpendicularly from an end of the engaging section in a second direction which is generally opposite to the first direction, and a guideway is defined in the operating section for receiving the stopping tab of the bracket, the elastic section providing the locating plate with elastic deformation capability.

2. The fastening device as claimed in claim 1, wherein the elastic section of the locating plate extends from an end of the engaging section of the locating plate which is opposite to the operating section.

3. The fastening device as claimed in claim 2, wherein a positioning section extends from a free end of the elastic section.

4. The fastening device as claimed in claim 3, wherein a height of the positioning section is greater than a height of the elastic section.

5. The fastening device as claimed in claim 3, wherein a pair of hooks is stamped from the side panel of the bracket forward of the stopping tab, and a blocking protrusion is formed on the side panel forward of but generally between the hooks.

6. The fastening device as claimed in claim 5, wherein the hooks and the protrusion of the bracket cooperatively define a space therebetween pressingly receiving the positioning section of the locating plate.

7. The fastening device as claimed in claim 5, wherein the hooks are generally L-shaped.

8. The fastening device as claimed in claim 1, wherein a pair of reinforcing flanges is bent from opposite edges of the engaging section to be oriented at obtuse angles relative to an outer face of the engaging section.

9. The fastening device as claimed in claim 1, wherein the stopping tab is generally L-shaped, for protecting the elastic section of the locating plate from excessive deformation by engaging with the engaging section.

10. The fastening device as claimed in claim 1, wherein the bracket has another side panel opposite to the said side panel.

11. The fastening device as claimed in claim 10, wherein a plurality of support tabs are formed on the said side panel and the said another side panel of the bracket, for supporting the data storage device.

12. A data storage device assembly comprising:
    a data storage device defining a hole in one side wall thereof, and comprising a screw secured to an opposite side wall thereof;
    a bracket having first and second side panels, the first side panel defining a slot therein, the second side panel defining a groove therein for slidingly receiving the screw, a plurality of support tabs being formed in the bracket to support the data storage device; and
    a locating plate secured to the first side panel of the bracket, the locating plate comprising an engaging section and an elastic section, the engaging section forming a latch stamped toward and received in the slot of the bracket and the hole of the data storage device, the elastic section providing the locating plate with elastic deformation capability so that the latch can resiliently move in and out of the slot of the bracket.

13. The data storage device assembly as claimed in claim 12, wherein the locating plate further comprises an operating section extending perpendicularly from an end of the engaging section, for facilitating operation of the locating plate.

14. The data storage device assembly as claimed in claim 13, wherein the first panel of the bracket forms a generally L-shaped stopping tab, and the operating section of the locating plate defines a guideway receiving the stopping tab therein, the stopping tab protecting the locating plate from excessive deformation by engaging with the engaging section.

15. The data storage device assembly as claimed in claim 12, wherein the locating plate further comprises a positioning section secured to the first side panel of the bracket, the positioning section is connected with the engaging section via the elastic section, and the elastic section is arcuate.

* * * * *